Jan. 7, 1964  W. R. JOHNSON  3,117,278
NOISE REDUCING SYSTEM
Filed Dec. 19, 1960  3 Sheets-Sheet 1
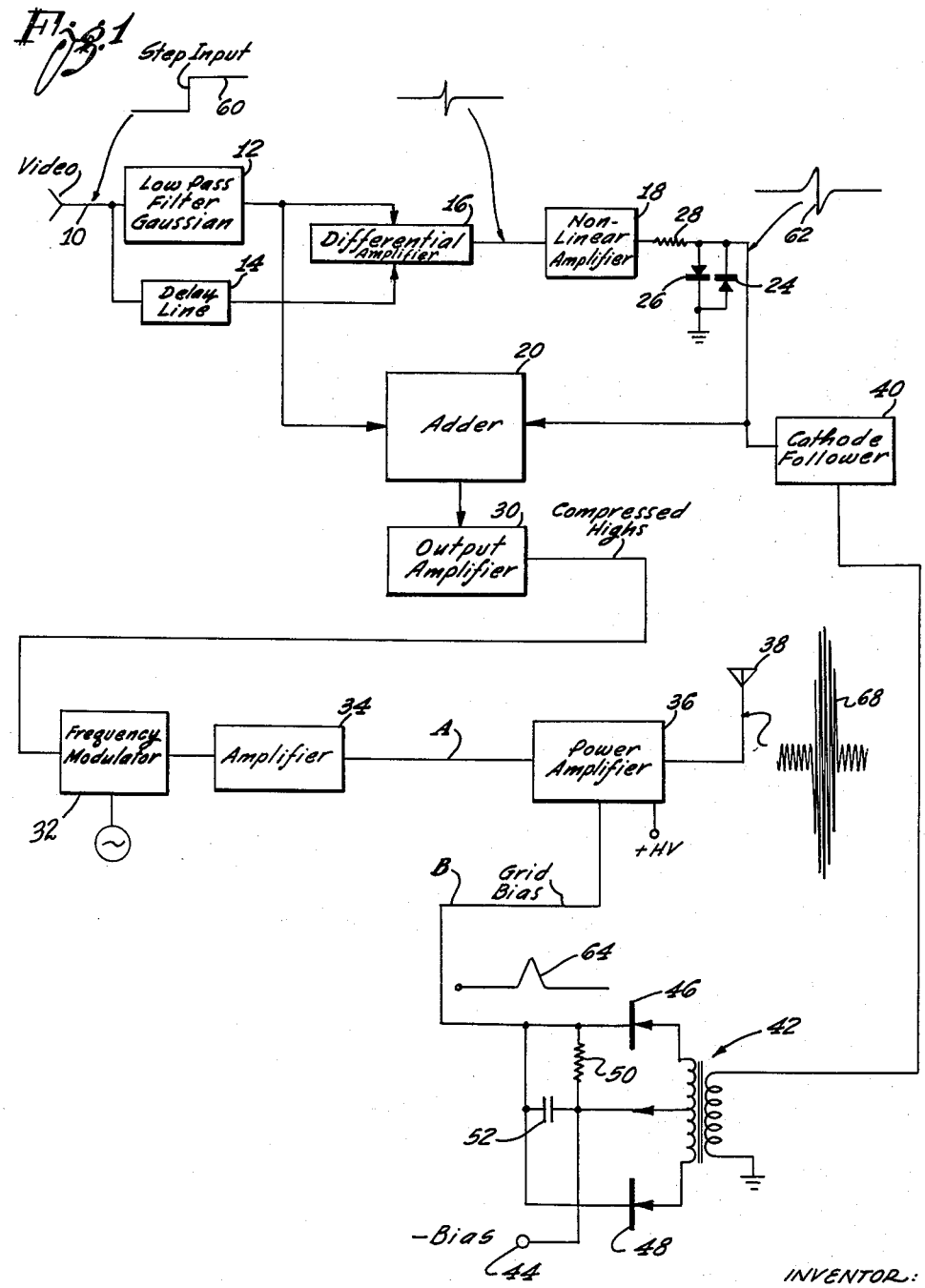
INVENTOR:
Wayne R. Johnson
By Smyth, Roston & Pavitt
Attorneys.

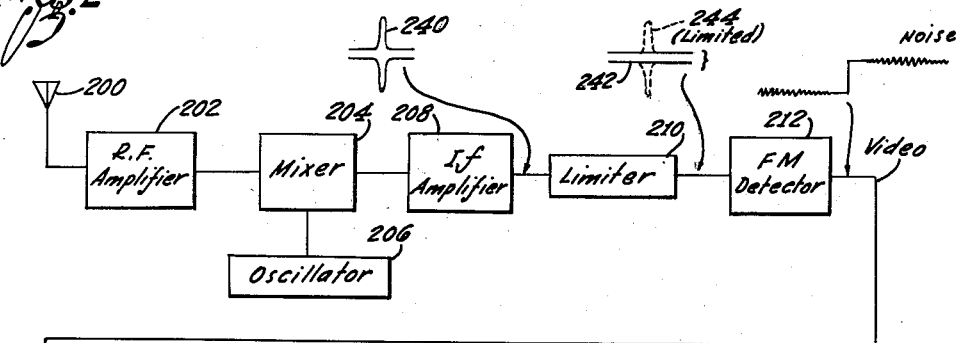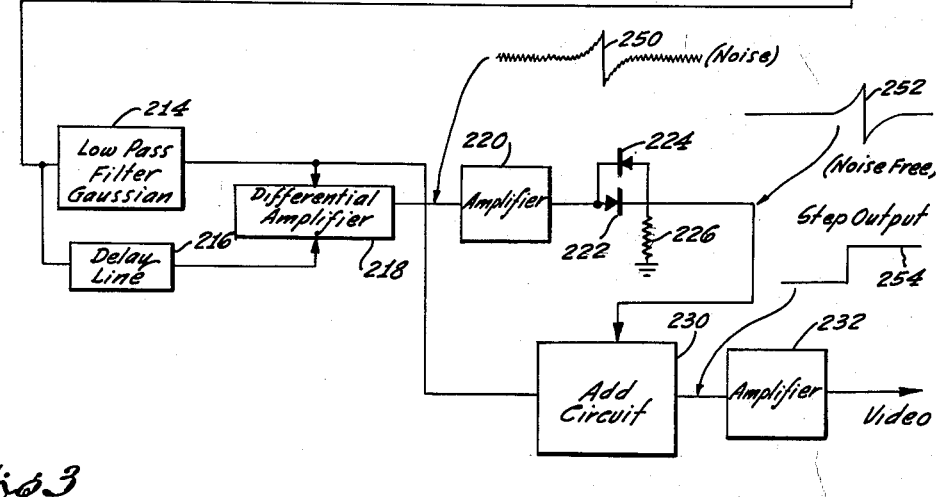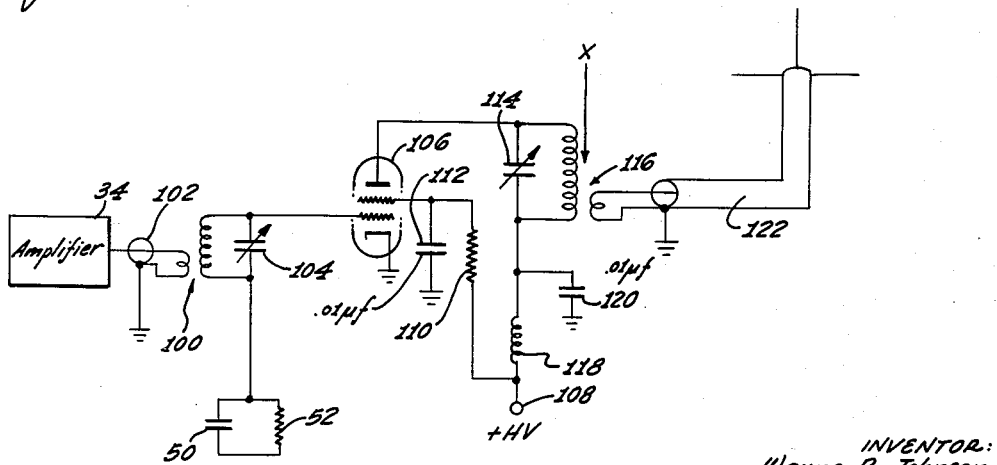

Jan. 7, 1964 W. R. JOHNSON 3,117,278
NOISE REDUCING SYSTEM
Filed Dec. 19, 1960 3 Sheets-Sheet 3
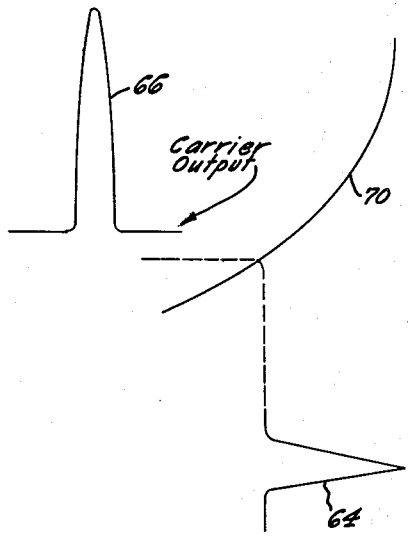
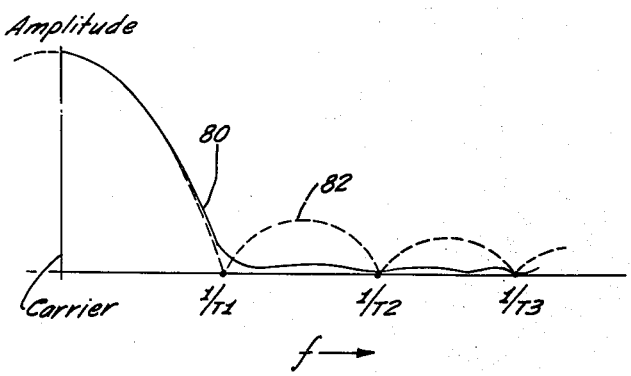
INVENTOR:
Wayne R. Johnson
By Smyth, Roston & Pavitt
Attorneys

United States Patent Office 3,117,278
Patented Jan. 7, 1964

3,117,278
NOISE REDUCING SYSTEM
Wayne R. Johnson, Los Angeles, Calif., assignor to Minnesota Mining and Manufacturing Company, St. Paul, Minn., a corporation of Delaware
Filed Dec. 19, 1960, Ser. No. 76,707
17 Claims. (Cl. 325—65)

This invention relates to apparatus for improving the signal-to-noise ratio of signals which receive a transducing action. More particularly, the invention relates to apparatus for separating the signals in a band of frequencies into signals in a first particular range and signals in a second particular range and for nonlinearly amplifying the signals in the first particular range relative to the signals in the second particular range in such a manner as to increase the signal-to-noise ratio of the signals in the band. The invention is especially effective in systems where most of the noise is concentrated in the first particular range of frequencies.

In certain applications, such as the recording of information in magnetic form on a medium such as a tape and the subsequent reproduction from the tape of electrical signals representing such information, the signals have a limited range of frequencies such as a range of zero cycles to approximately four megacycles per second. In such applications, it has been found difficult to reproduce accurately information represented by signals in certain ranges of the band of frequencies between zero cycles per second to four megacycles per second. This has been especially true at the extreme ends of the band of frequencies, such as the low frequencies and in the high frequencies approaching four megacycles per second. The difficulties in obtaining such accurate reproduction have resulted from the fact that noise occurs at the low frequencies and high frequencies. This noise is of such amplitude relative to the information signals that the noise masks the information signals and prevents the information signals from being accurately reproduced from the magnetic medium.

In copending application Serial No. 53,594 filed August 30, 1960, by me (constituting a continuation of application Serial No. 619,142 filed October 30, 1956 and now abandoned, a system is disclosed and claimed for improving the signal-to-noise ratio in particular ranges of frequencies such as the frequencies approaching four megacycles per second. The system disclosed in copending application Serial No. 53,594 has particular utility when video and sound information is to be reproduced from a magnetic medium. However, the system may also have other important uses such as in the transmission of information signals from a first position and the reception of such signals and the detection of the information in the signals at a second position removed from the first position.

In the system disclosed and claimed in copending application Serial No. 53,594, the signals representing the video and sound are separated into first and second ranges of frequencies before the signals become recorded on the magnetic medium such as the tape. The signals in the first range of frequencies may have frequencies above 1.2 megacycles per second and the signals in the second range of frequencies may have frequencies less than 1.2 megacycles per second. The signals in the first range of frequencies are compressed in amplitude by a factor dependent upon the amplitude of the signals. For example, the signals in the first particular range of frequencies may be compressed to a fractional power of their instantaneous amplitude. The compressed signals may thereafter be linearly amplified to a maximum amplitude approaching the maximum amplitude of the signals in the first particular range before such amplitude compression.

If the signals in the first particular range of frequencies are linearly amplified after compression, the signals in the second range of frequencies are also linearly amplified. The amplified signals in the first particular range are then combined with the amplified signals in the second particular range to produce signals which are recorded on the magnetic medium such as the tape. By compressing the signals in the first particular range and then linearly amplifying such signals, the signal-to-noise ratio becomes considerably enhanced. This results from the fact that the compression and subsequent expansion of the amplitudes of the signals in the first particular range causes the signals in the first particular range to be effectively amplified relative to the signals in the second particular range before the signals receive a transducing action.

In application Serial No. 619,142, the signals are reproduced from the magnetic medium such as the tape and are again separated into signals in the first and second particular ranges. The amplitudes of the signals in the first particular range are then expanded by a factor which is inverse to the compression of the signals in the recorder. The expanded signals in the first particular range are combined with the signals in the second particular range to obtain output signals which correspond to the input signals. These output signals directly represent the video and audio information.

This invention provides a system which constitutes an improvement over the system disclosed and claimed in application Serial No. 53,594. In the system constituting this invention, the input signals representing certain information are separated into signals in a first particular range and in a second particular range in a manner similar to that described above. The signals in the first particular range are compressed in amplitude and may then be linearly expanded in amplitude after compression in a manner similar to that described above in application Serial No. 53,594. The modified signals in the first particular range are then combined with the signals in the second particular range as described in application Serial No. 53,594.

As a distinctive feature of this invention, the resultant signals are modulated in frequency in accordance with the amplitudes of such signals. The amplitudes of such frequency modulated signals are then further expanded in accordance with the amplitudes of the signals in the first particular range. This further amplification is provided to enhance the signal-to-noise ratio of the resultant signals. The amplification may occur on a non-linear basis such that the amplitudes of the frequency modulated signals become progressively increased in accordance with increases in the amplitudes of the signals in the first particular range. The frequency modulated signals of expanded amplitudes may then be transmitted to a distant position or provided with any other suitable transducing action.

The signals received at the distant position in the system constituting this invention are first subjected to a limiting action so that only amplitudes within a particular range are passed. This limiting action may occur since all of the information in the signals is represented by frequency modulations rather than amplitude modulations. The signals of limited amplitude are then detected in frequency to produce signals having at each instant an amplitude related to the frequency of the received signals. The detected signals are subsequently separated into the signals in the first particular range of frequencies and in the second particular range of frequencies. The signals in the first particular range of frequencies are then expanded in a manner similar to that described in application Serial No. 53,594. The expanded signals in the first particular range are combined with the signals in the second particular range to reproduce the input signals.

As will be seen from the above discussion, one of the distinctive features of the invention is that the modified signals produced in accordance with the disclosure in application Serial No. 53,594 are frequency modulated in accordance with their amplitude at each instant. Another distinctive feature of the invention is that these frequency modulated signals are further boosted in amplitude in accordance with the amplitudes of the signals in the first particular range of frequencies. By boosting the amplitude of the frequency modulated signals in this matter, the signal-to-noise ratio of the signals becomes enhanced before the signals become transmitted to a distant position or provided with any other suitable transducing action. The boost in the amplitude of the frequency modulated signals at the transmitter does not affect the recovery of information from the signals at the receiver since the information is represented by the frequency modulations. It is for this reason that the amplitude of the signals at the receiver can be limited before the frequency modulations are detected.

The amplitudes of the signals at the transmitter are boosted after the modulation of the signals in frequency for other important reasons. One reason is that the noise tends to increase with frequencies when frequency modulated signals are used. Another reason is that the noise at the receiver tends to be higher for the signals in the first particular range than for the signals in the second particular range. This is especially true in the stages where the signals in the first particular range become expanded in amplitude to restore the amplitudes of the signals to the original amplitudes which existed before the compression of the amplitudes of these signals at the recorder or transmitter. In this way, the boost in amplitude of the signals at the transmitter after the modulation of such signals in frequency tends to compensate for the increase in noise in such signals at the receiver.

In the drawings:

FIGURE 1 is a circuit diagram, primarily in block form, of apparatus for modulating signals in accordance with the concepts of this invention and for obtaining a transmission of such signals to a distant position.

FIGURE 2 is a circuit diagram, primarily in block form, of apparatus at the distant position for receiving the transmitted signals and for demodulating such signals in accordance with the concepts of this invention to obtain a reproduction of the information represented by such signals.

FIGURE 3 is a circuit diagram of certain stages shown in block form in FIGURE 1.

FIGURE 4 illustrates wave forms of voltages developed at strategic terminals by the circuitry shown in the previous figures.

FIGURE 5 illustrates a frequency spectrum of signals produced by a particular one of the amplifier stages in FIGURE 1 and further illustrates, by way of contrast, a frequency spectrum of signals not receiving such amplification.

In the embodiment of the transmitter shown in FIGURE 1, electrical signals representing certain information such as video information are introduced through a line 10 to the input terminals of a low-pass filter 12 and a delay line 14. The filter 12 may be a Gaussian type of filter. The output signals from the low-pass filter 12 and the delay line 14 are in turn introduced to input terminals of a differential amplifier 16, the output of which is connected to a non-linear amplifier 18.

The signals from the low-pass filter 12 also pass to the input terminal of an adder 20, a second input terminal of which is connected to receive the signals produced on the cathode of a diode 24 and the plate of a diode 26. The cathode of the diode 24 and the plate of the diode 26 are actually included in the non-linear amplifier 16 with a resistance 28. The plate of the diode 24 and the cathode of the diode 26 are connected to a suitable reference potential such as ground.

The signals from the adder 20 are introduced to the input terminal of an output amplifier 30 having its output terminal connected to a frequency modulator 32. The signals from the frequency modulator 32 in turn pass to an amplifier 34 which may have linear characteristics. The signals from the amplifier 34 are introduced to a power amplifier 36 having non-linear characteristics in a manner similar to that discussed in detail subsequently. The output terminal of the amplifier 36 is in turn connected to a transducer such as an antenna 38 or to any other suitable form of transducer. If there are no problems resulting from the saturation of a magnetic medium such as a tape as a result of the use of the power amplifier 36, the transducer may even be a record head which is disposed in contiguous relationship to the tape to record signals in magnetic form on the tape. The signals from the amplifier 36 may be introduced directly to the antenna 38 or may be introduced to an oscillator which produces carrier signals, these carrier signals being modulated by the signals from the amplifier 36 and introduced to the antenna.

In addition to passing to an input terminal of the amplifier of the adder 20, the signals from the diodes 24 and 26 are also introduced to an input terminal of a cathode follower 40. The output terminal of the cathode follower 40 is connected to one terminal in the primary winding of a transformer 42, the second terminal in the primary winding being connected to a suitable reference potential such as ground. The secondary winding of the transformer 42 is center tapped. This center tap is connected to receive a suitable reference potential such as a negative potential as indicated at 44 and is also connected to first terminals of a resistance 50 and a capacitance 52. The end terminals of the secondary winding in the transformer 32 respectively have common connections with the plates of diodes 46 and 48. The cathodes of the diodes 46 and 48 are connected to second terminals of the resistance 50 and the capacitance 52 and to an input terminal of the power amplifier 36.

The video signals introduced through the input lead 10 may have a suitable range of frequencies such as zero cycles to approximately four megacycles per second. However, only the signals in a second particular range of frequencies such as in the range of zero cycles to approximately two megacycles per second are able to pass through the filter 12 because of the characteristics provided for the filter. The signals in the second particular range of frequencies are delayed slightly during their passage through the filter because of the inherent characteristics of the filter. A similar delay is provided by the line 14 to the passage of the video signals in the complete band of frequencies as represented by frequencies of zero cycles to four megacycles per second. In this way, the differential amplifier 16 receives signals having the same time relationship from the filter 12 and the delay line 14.

The differential amplifier operates to subtract the signals passing through the filter 12 from the signals passing through the delay line 14. In this way, only the signals in a first particular range of frequencies such as in the range of approximately two megacycles per second to approximately four megacycles per second are able to pass through the differential amplifier 16. These signals are amplified on a non-linear basis by the amplifier 18 such that the amplitudes of the input signals to the amplifier are compressed by the amplifier. For example, the amplifier 18 may operate to compress the input signals by a power factor less than unity. This power factor may be expressed by the relationship $A_0 = bA1/n$, where $b$ is a constant of proportionality,
$n$ has a value greater than unity,
$A_0$ is the output from the amplifier and
$A$ is the input to the amplifier.

The construction of an amplifier suitable for use as the amplifier 18 is disclosed in detail in copending application Serial No. 53,594 filed in the U.S. Patent Office on August 30, 1960.

The signals of compressed amplitude from the amplifier 18 in the second particular range are combined in the adder 20 with the signals from the low-pass filter 12 to produce modified signals. These modified signals may be then linearly amplified by the stages 30 and introduced to the frequency modulator 32. The frequency modulator 32 operates in a conventional manner to produce signals which are modulated in frequency at each instant in accordance with the modulations in amplitude of the signals from the amplifier 30 at that instant. The frequency modulated signals may be further amplified on a linear basis by the stages 34 and introduced to the stages 36. The signals introduced to the amplifier 36 become amplified on a non-linear basis as will be described in detail subsequently.

The operation of the amplifier 36 and the stages associated with the amplifier may be seen from the waveforms schematically illustrated in FIGURE 1. For example, the video signals may have at any instant a waveform schematically illustrated at 60 in FIGURE 1. This waveform may result from an instantaneous change in picture from complete black to complete white. Under such circumstances, the signal passed by the amplifier 18 may have a waveshape illustrated schematically at 62 in FIGURE 1. This signal is introduced to the cathode follower 40, which operates to provide an isolation in impedance between the amplifier 18 and the transformer 42.

The diodes 46 and 48, the resistance 50 and the capacitance 52 operate as a full wave rectifier with the secondary winding of the transformer 42 to convert the signals 62 from the amplifier 18 into signals having a waveshape illustrated at 64 in FIGURE 1. For example, the positive portion of the signal 62 causes a positive signal to be induced in the secondary winding of the transformer 42 and to pass through the diode 46 and produce a corresponding charge across the capacitance 52. The negative portion of the signal 62 causes a negative signal to be induced in the secondary winding of the transformer 42 such that a positive signal is produced on the bottom terminal of the winding in FIGURE 1. This signal causes current to flow through the diode 48 and to charge the capacitance 52 in the same direction as that produced by the positive portion of the signal 62. The resistance 50 is connected across the capacitance 52 to provide a discharge path for the capacitance so that the amplitude of the voltage across the capacitance 52 is able to follow the amplitude characteristics of the signal 62.

The power amplifier 36 may have non-linear characteristics similar to those shown in FIGURE 4. These characteristics 70 are represented by the relationship between the input voltage 64 to the amplifier and an output response 66 from the amplifier. As will be seen, the output response 66 increases by a factor greater than unity with progressive increases in the input voltage 64. This causes an output pulse 68 to be produced from the amplifier with characteristics which may be represented by a $(\cos^2)$ relationship.

FIGURE 5 further illustrates the advantages of frequency modulating the signals from the output amplifier 30 and then subsequently amplifying the signals on a non-linear basis in the power amplifier 36. This may be seen from a comparison in amplitude between the frequency spectrum of the signals from the amplifier 36 and the frequency spectrum of the signals without such amplification. The relationship between the amplitude and frequency of the signals from the amplifier 36 is illustrated in solid lines at 80 in FIGURE 1. The relationship between the amplitude and frequency of the signals without such further amplification is illustrated in broken lines at 82 in FIGURE 1. As will be seen, the curves 80 and 82 are almost identical for frequencies extending from the carrier frequency $f$ to a first null frequency designated at $1/T_1$. This null frequency and subsequent null frequencies $1/T_2$, $1/T_3$, etc., are dependent upon the width of the pulse 64 introduced to the amplifier 36. However, the signals from the amplifier 80 have considerably less amplitude for frequencies above the null frequency $1/T_1$ than the signals not receiving such additional amplification. This reduction in the spectrum splatter of the signals from the amplifier 36 causes an enhanced efficiency to be obtained from the antenna 38 of energy representing information.

The use of the power amplifier 36 offers other advantages. This results from the fact that the power amplifier normally produces signals at a relatively low level of power and that the power level of the signals from the power amplifier increases only upon the occurrence of signals in the first range of frequencies. Since the power amplifier 36 produces peak powers only on an instantaneous and interrupted basis, the amplifier 36 can be designed to withstand power dissipations having a relatively low average. This results in a considerable savings in size, weight and cost of the system constituting this invention.

FIGURE 3 illustrates in detail one embodiment of the power amplifier 36. It will be appreciated, however, that other forms of the power amplifier 36 may also be used. In the embodiment shown in FIGURE 3, the output from the amplifier 34 is introduced to one terminal of the primary winding in a transformer 100, the second terminal of the primary winding being connected to receive a suitable reference potential such as ground. The introduction of signals from the amplifier 34 to the primary winding of the transformer 100 preferably occurs through a coaxial cable 102 having a suitable impedance such as approximately 50 ohms.

The secondary winding of the transformer 100 is connected to receive the voltage 64 from the parallel combination of the capacitance 50 and the resistance 52 in FIGURE 1. The secondary winding of the transformer 100 and a variable capacitance 104 form a tuned circuit. The output from the tuned circuit is introduced to the control grid of a power tube 106 which may be an Eimac Type 4X–150 manufactured by Eitel-McCullough. The cathode of the tube 106 is connected to receive a suitable reference potential such as ground. The screen grid of the tube 106 has a positive voltage of relatively great magnitude applied to it from a terminal 108 through a resistance 110. A capacitance 112 extends electrically from the screen grid of the tube 106 to the reference potential such as ground.

A tuned circuit comprising a variable capacitance 114 and the primary winding of a transformer 116 in parallel is connected to the plate of the tube 106. The tuned circuit formed by the capacitance 114 and the primary winding of the transformer 116 has a resonant frequency corresponding to that of the tuned circuit formed by the capacitance 104 and the secondary winding of the transformer 100. A radio frequency choke 118 is connected between the terminal 108 and the tuned circuit formed by the capacitance 114 and the primary winding of the transformer 116. A capacitance 120 extends electrically from the tuned circuit to the reference potential such as ground.

The secondary winding of the transformer 116 is connected to the central conductor and the external conductor of a coaxial cable 122, the external conductor of the coaxial cable 122 being connected to the reference potential such as ground. The signals in the coaxial cable 122 are introduced to the antenna 38 as described above.

The frequency modulated signals from the amplifier 34 are introduced to the grid of the tube 106 through the tuned circuit formed by the capacitor 104 and the secondary winding of the transformer 100, as are the signals from the parallel combination of the capacitance 52 and the resistance 50. The tube 106 is normally conductive but is biased by the potential on the terminal 44 in FIG. 1 at a level close to a state of non-conductivity. For example, the tube 106 may be normally biased to a level to deliver only 1/100 of peak power. The tube 106 is provided with characteristics such that the power output from the tube increases rapidly with increases in the potential applied to the control grid of the tube. The resultant output from the tube is applied to the coaxial cable 122 through the tuned circuit formed by the capacitance 114 and the transformer 116.

Apparatus is shown in FIGURE 2 for receiving and detecting the signals from the antenna 38 in FIGURE 1 to recover the information represented by the signals. It will be appreciated, however, that the signals shown in FIGURE 2 may be used for other purposes and may even be used to recover the signals recorded on a magnetic medium such as a tape if problems of signal saturation on the taper are not encountered from the use of the power amplifier 36. This may be accomplished by substituting a reproducer head for an antenna 200 shown in FIGURE 2 and by disposing the transducer head in contiguous relationship to the magnetic tape.

The signals from the antenna 200 in FIGURE 2 are introduced to an amplifier such as a radio frequency amplifier 202. The signals from the amplifier 202 in turn pass to a mixer 204 which also receives signals from an oscillator 206. The output terminal of the mixer 204 is connected to an input terminal of an amplifier 208 having its output terminal connected to a limiter 210. A connection is made from the output terminal of the limiter 210 to an input terminal of a frequency detector 212.

The signals from the detector 212 are introduced to a low pass filter 214 and to a delay line 216. The output signals from the low pass filter 214 and the delay line 216 are in turn mixed in a differential amplifier 218 and the resultant signals from the amplifier 218 are passed to an amplifier 220. The amplifier 220 may be considered to include a pair of diodes 222 and 224, one terminal of each diode extending electrically through the resistance 226 to the reference potential such as ground. The amplifier 220 including the diodes 222 and 224 and the resistance 226 may be constructed in a manner shown and described in detail in copending application Serial No. 53,594. The output signals from the amplifier 220 and from the low pass filter 214 pass to an input terminal of an add circuit 230. A connection is made from the output terminal of the add circuit 230 to an input terminal of an amplifier 232.

The signals received by the antenna 200 are amplified in the stage 202 and are heterodyned in the mixer 204 with the signals from the oscillator 206 to produce signals having a beat frequency. These signals are amplified in the intermediate frequency amplifier 208 and are then introduced to the limiter 210 with amplitude characteristics similar to those indicated at 240 in FIGURE 2. The limiter 210 acts in a conventional manner to limit the amplitude of the signals 240 so as to produce signals having characteristics indicated at 242 in FIGURE 2. As will be seen by broken lines, the peaked portions 244 of the signals 240 are eliminated in producing the signals 240. The peak portions 244 can be eliminated since the information is represented by the frequency modulations of the signals rather than the amplitude modulations of the signals.

The frequency of the signals from the limiter 210 are then detected by the stage 212 such that the signals from the stage 212 have amplitude variations corresponding to the frequency variations of the signals introduced to the stage. The amplitude-modulated signals from the detector 212 are introduced to the low pass filter 214, which passes only the signals in the second particular range of frequencies such as in the range of 0 cycles to approximately 1.2 megacycles per second. The amplitude-modulated signals from the detector 212 also pass through the delay line 216, which operates to delay the signals for a period of time corresponding to the delay inherent in the operation of the low pass filter 214. The signals from the delay line 216 and the low pass filter 214 are mixed in the differential amplifier 218 to obtain the production of signals in only the first particular range of frequencies from the amplifier. As previously described, this range of frequencies may extend upwardly from approximately 1.2 megacycles per second. The signals from the differential amplifier 218 are illustrated at 250 in FIGURE 2.

The signals 250 are then expanded in amplitude by the stage 220 by a factor inverse to the compression of the signal amplitudes by the amplifier 18 in FIGURE 1. For example, the signals 250 may be expanded in amplitude in accordance with the relationship $A_1 = bA^n$, where
$A_1$ = the output from the amplifier 220;
$A$ = the input to the amplifier 220; and
$n$ = an integer greater than 1.

This expansion in amplitude may be obtained when the amplifier 18 in FIGURE 1 operates to compress the amplitudes of the signals in accordance with the relationship $$A = bA_0^{1/n}$$

as described above. The signals of expanded amplitude in the first particular range are illustrated at 252 in FIGURE 2. The signals are combined in the adder 230 with the signals in the second particular range to produce signals 254. As will be seen, the signals 254 have characteristics corresponding to those of the input signals 60 in FIGURE 1. The signals 254 may be linearly amplified in the stage 232.

As has been previously described, the signal-to-noise ratio becomes enhanced by the operation of the frequency modulator 32 and the power amplifier 36 before the signals become transmitted from the antenna 38. This enhancement of the signal-to-noise ratio is desirable because of the noise produced in certain of the stages shown in FIGURE 2. For example, the amount of noise produced in the amplifier 220 increases with increases in the amplitude of the signals passing through the diodes 224 and 226. Furthermore, the noise spectrum tends to increase at a particular rate such as 6 db per octave with increases in frequency. In this way, the inclusion of the frequency modulator 32 and the power amplifier 36 at the transmitter shown in FIGURE 1 tends to compensate for the noise produced in the receiver shown in FIGURE 2. This results from the fact that the power amplifier 36 becomes particularly effective upon the occurrence of signals in the first particular range and in accordance with the amplitudes of such signals.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for improving the signal-to-noise ratio of a band of input signals by changing the characteristics of the signals in the band where noise occurs primarily in a first particular range of frequencies in the band and where the signals with the changed characteristics are subjected to a wireless transmission, means responsive to the input signals for compressing the amplitudes of the signals in the first particular range of frequencies in the band in a first particular non-linear relationship with respect to the amplitudes of the signals in the remainder of the band to produce modified input signals, means responsive to the modified input signals for producing signals having frequency modulations in accordance with the amplitudes of the modified input signals, means responsive to the frequency modulated signals and to the signals in the first particular range of frequencies for boosting the amplitude of the frequency modulated signals in a particular non-linear relationship in accordance with the amplitudes of the signals in the first particular range of frequencies to produce resultant signals, and means responsive to the resultant signals for providing a wireless transmission of such signals.

2. The combination set forth in claim 1 in which the amplitude-boosting means are constructed to provide a non-linear amplification of the frequency modulated signals wherein the amplification factor increases progresively with increases in the amplitude of the signals in the first particular range of frequencies and in which the means compressing the amplitudes of the signals in the first particular range of frequencies compresses the signals with a power factor less than unity.

3. In combination for improving the signal-to-noise ratio of a band of input signals by changing the characteristics of the signals in the band where noise occurs primarily in a first particular range of frequencies in the band and where the signals with the changed characteristics are subjected to a wireless transmisison, means responsive to the input signals for separating the input signals into signals in the first particular range of frequencies and in a second range of frequencies forming the band of the input signals with the first particular range of signals, means responsive to the signals in the first particular range for compressing the amplitudes of such signals in a first particular non-linear relationship, means responsive to the compressed signals in the first particular range and the signals in the second particular range for combining such signals to produce resultant signals, means responsive to the resultant signals for converting the signals into a frequency modulated form involving an increase in noise for signals in the first particular range relative to the signals in the second particular range, and means responsive to the converted signals and the compressed signals in the first particular range for providing a second particular non-linear amplification of the converted signals in accordance with the amplitude of the compressed signals in the first particular range and for providing such amplification on a progressive basis with increases in the amplitude of the compressed signals in the first particular range.

4. In combination for improving the signal-to-noise ratio of a band of input signals by changing the characteristics of the signals in the band where noise occurs primarily in a first particular range of frequencies in the band and where the signals with the change characteristics are subjected to a wireless transmission and where the signals in the first particular range of frequencies are subjected to noise during the conversion of the characteristics of the signals back to those of the input signals, means responsive to the input signals for separating the input signals into first signals in the first particular range and second signals in a second particular range of frequencies which form the band with the first particular range of frequencies and which combine with the signals in the first particular range to form the input signals, means responsive to the signals in the first particular range for compressing the amplitudes of such signals in a first particular non-linear relationship in accordance with the amplitude characteristics of the signals in the first particular range, means responsive to the compressed signals in the first particular range and to the second signals in the second particular range for combining such signals to produce resultant signals, means responsive to the resultant signals for modulating the resultant signals in frequency in accordance with the amplitudes of the resultant signals, and means responsive to the compressed signals in the first particular range and the frequency modulated signals for varying the characteristics of the frequency modulated signals on a second particular non-linear basis in accordance with the amplitude of the compressed signals in the first particular range to compensate for the noise produced in the first particular range during the conversion of the characteristics of the transmitted signals back to those of the input signals.

5. In combination for improving the signal-to-noise ratio of a band of input signals where noise occurs primarily in a first particular range of the frequencies in the band and where the signals have changes in amplitude at different periods of time, first means responsive to the input signals for separating the input signals into first signals in the first particular range and second signals in a second particular range complementary to the first particular range with respect to the range of frequencies of the input signals where the first and second particular signals constitute the input signals, second means responsive to the first signals in the first particular range for producing third signals having an amplitude which constitute a fractional power less than unity of the amplitudes of the first signals, third means responsive to the first and third signals for combining such signals to produce resultant signals, means responsive to the resultant signals for converting the signals into a modulated form involving an increase in noise for signals in the first particular range relative to the signals in the second particular range, and fourth means responsive to the signals in modulated form and to the signals in the first particular range for amplifying the signals in modulated form by an amplitude factor which increases at a progressive rate greater than unity in accordance with progressive changes in the amplitude of the signals in the first particular range.

6. The combination set forth in claim 5 in which the resultant signals are frequency modulated in accordance with the amplitudes of such resultant signals and in which the fourth means are operative upon the frequency modulated signals to modulate such signals.

7. In combination for improving the signal-to-noise ratio of a band of input signals where noise occurs primarily in a first particular range of the frequencies in the band and where the signals have changes in amplitude at different periods of time, means responsive to the input signals for separating the input signals into first particular signals having the first particular range of frequencies and into second particular signals having a second particular range of frequencies where the first and second particular ranges of frequencies comprise the band of frequencies in the input signals and where the first and second particular signals constitute the input signals, means responsive to the first particular signals for compressing the amplitudes of such signals in a first particular non-linear relationship in accordance with variations in the amplitude of such signals, means responsive to the signals in the second particular range and to the compressed signals in the first particular range for combining such signals, means responsive to the combined signals for linearly amplifying such signals, means responsive to the amplified signals from last mentioned means for modulating such signals in frequency in accordance with the amplitudes of the amplified signals, and means responsive to the signals in the first particular range and to the frequency modulated signals in amplified form for increasing the amplitudes of the frequency modulated signals by a second non-linear factor greater than unity in accordance with the amplitudes of the signals in the first particular range.

8. In combination for improving the signal-to-noise ratio of a band of input signals where noise occurs primarily in a first particular range of the frequencies in the band and where the signals have changes in amplitude at different periods of time, means responsive to the input signals for separating the input signals into first particular signals in the first particular range and second particular signals in the remaining range of signals comprising the band of input signals where the first and second particular signals form the input signals, means responsive to the first particular signals for compressing the amplitudes of the first particular signals in a first particular non-linear relationship in accordance with the amplitude characteristics of such signals to produce third particular signals, means responsive to the second and third particular signals for combining such signals to produce resultant signals, means reponsive to the resultant signals for frequency modulating such signals in accordance with the amplitudes of the resultant signals, means responsive to the signals in the first particular range and to the frequency modulated signals for amplifying the amplitudes of the frequency modulated signals by a second particular non-linear factor greater than unity in accordance with progressive changes in the amplitude of the signals in the first particular range to produce output signals, first transducing means responsive to the output signals for producing a wireless transmission of the output signals, second transducing means responsive to the wireless transmission of the signals by the first transducing means for reproducing the output signals, and means responsive to the reproduced output signals for restoring the input signals.

9. In combination for improving the signal-to-noise ratio of a band of input signals where noise occurs primarily in a particular range of the frequencies in the band and where the signals have changes in amplitude at different periods of time, means responsive to the input signals for separating the input signals into signals in the first particular range and signals in a second particular range constituting the band of signals with the signals in the first particular range, means responsive to the signals in the first particular range for compressing the amplitudes of such signals in a first particular non-linear relationship in accordance with the amplitude characteristics of such signals, means responsive to the compressed signals in the first particular range and to the signals in the second particular range for combining such signals to produce resultant signals, means responsive to the resultant signals for varying the frequency of the resultant signals in accordance with the amplitudes of the resultant signals, and means responsive to the signals in the first particular range and to the signals from the last mentioned means for non-linearly amplifying the characteristics of the signals from the last mentioned means in a second particular non-linear relationship in accordance with the changes in the amplitudes of the signals in the first particular range.

10. In combination for improving the signal-to-noise ratio of a band of input signals by compressing the amplitudes of the signals in a first particular range of frequencies in the band in a particular non-linear relationship to produce modified signals and by frequency modulating the modified signals and by amplifying the frequency modulated modified signals in accordance with the amplitude characteristics of the signals in the first particular range of frequencies and by providing a wireless transmission of such amplified frequency modulated signals, means for receiving the transmitted signals, means responsive to the transmitted signals for passing amplitudes of signals equal to or less than a particular value, means responsive to the signals from the last mentioned means for detecting the frequency modulations of such signals to produce signals having amplitude modulations related to the frequency modulations, and means responsive to the amplitude-modulated signals for expanding the amplitudes of the signals in the first particular range of frequencies by a non-linear factor inversely related to the compression of the amplitudes of the input signals to produce output signals having characteristics corresponding to those of the input signals.

11. In combination for improving the signal-to-noise ratio of a band of input signals by compressing the amplitudes of the signals in a first particular range of frequencies in the band in a particular non-linear relationship to produce modified signals and by frequency modulating the modified signals and by amplifying the frequency modulated modified signals in accordance with the amplitude characteristics of the signals in the first particular range of frequencies and by providing a wireless transmission of such amplified frequency modulated signals, means for receiving the transmitted signals, means responsive to the received signals for limiting the amplitude of the received signals, means responsive to the amplitude-limited signals for providing a frequency demodulation of such signals, means responsive to the frequency-demodulated signals for separating such signals into signals in the first particular range and signals in the second particular range, means responsive to the signals in the first particular range for expanding the amplitudes of such signals in a non-linear relationship inversely related to the particular non-linear relationship to restore the amplitudes of the signals separated in the first particular range from the input signals, and means responsive to the signals in the second particular range and to the expanded signals in the first particular range for combining such signals to produce output signals having characteristics corresponding to those of the input signals.

12. The combination set forth in claim 11 in which the amplitude-expanding means expands the amplitudes of the signals by a power factor greater than unity.

13. In combination for improving the signal-to-noise ratio of a band of input signals where noise occurs primarily in a first particular range of the band and where the signals in the first particular range are amplified in a first non-linear particular relationship to compress the amplitude of the signals throughout the range of amplitudes and where the amplitude-compressed signals in the first particular range are combined with the signals in a second particular range forming the signals in the band with the signals in the first particular range and where the combined signals are frequency modulated in accordance with the amplitudes of the combined signals and where the frequency modulated signals are radiated, means for receiving the frequency modulated signals, means responsive to the freqency modulated signals from the receiving means for detecting such signals to produce resultant signals having amplitudes in accordance with the frequency modulations of the received signals, means responsive to the resultant signals for separating such signals into signals in the first particular range and signals in the second particular range where the signals in the first and second particular ranges complement each other to form the resultant signals, means responsive to the signals in the first particular range for expanding the amplitudes of such signals by a non-linear factor inversely related to the compression of the input signals in the first particular range, and means responsive to the expanded signals in the first particular range and to the signals in the second particular range for combining these signals to produce signals having characteristics corresponding to those of the input signals.

14. In combination for improving the signal-to-noise ratio of a band of input signals by changing the characteristics of the signals in the band where noise occurs primarily in a first particular range of frequencies in the band and where the signals with the changed characteristics are subjected to a wireless transmission, means responsive to the input signals for separating the input signals into signals in the first patricular range of frequencies and in a second range of frequencies forming the band of the input signals with the first particular range of frequencies, means responsive to the signals in the first particular range for compressing the amplitudes of such signals in a first particular non-linear relationship in accordance with the amplitude characteristics of such signals, means responsive to the compressed signals in the first particular range and the signals in the second particular range for combining such signals to produce resultant signals, means responsive to the resultant signals for converting the signals into a modulated form involving an increase in noise for signals in the first particular range relative to the signals in the second particular range, and means responsive to the converted signals for providing a second particular non-linear amplification of the converted signals in accordance with the occurrence of the signals in the first particular range and for providing such amplification on a progressive basis with increases in the amplitude of the compressed signals in the first particular range, means responsive to the amplified converted signals for providing a wireless transmission of such signals, means responsive to the wireless transmission of the signals for providing a limiting action on such signals, means responsive to the limited signals for demodulating such signals to produce signals having amplitude modulations corresponding to the frequency modulations of the transduced signals, means responsive to the demodulated signals for separating such signals into signals of the first and second particular ranges of frequencies, means responsive to the demodulated signals in the first particular range for expanding the amplitudes of such signals in a non-linear relationship inverse to the first particular non-linear relationship to restore the amplitudes of such signals to those corresponding to the signals separated in the first particular range from the input signals, and means responsive to the expanded signals in the first particular range and to the demodulated signals in the second particular range for combining such signals to produce output signals having characteristics corresponding to those of the input signals.

15. The combination set forth in claim 1, including, means for receiving the transmitted signals, means responsive to the received signals for providing a limiting action on the amplitudes of the recovered signals, means responsive to the amplitude-limited signals for detecting the frequency modulations of such signals to produce signals having amplitude modulations related to the frequency modulations, and means responsive to the amplitude-modulated signals for boosting the amplitudes of the signals in the first particular range of frequencies by a non-linear relationship inverse to the compression of the amplitudes of the input signals in the first particular non-linear relationship to produce output signals having characteristics corresponding to those of the input signals.

16. The combination set forth in claim 4, including, means for providing a wireless transmission of the converted signals after the amplification of the converted signals in the second particular non-linear relationship, means for receiving the transmitted signals, means responsive to the received signals for limiting the amplitude of the received signals, means responsive to the amplitude-limited signals for providing a frequency demodulation of such signals to produce signals having amplitude modulations corresponding to the frequency modulations of the transduced signals, means responsive to the frequency-demodulated signals for separating such signals into signals in the first particular range of frequencies and signals in the second particular range of frequencies, means responsive to the frequency-demodulated signals in the first particular range of frequencies for expanding the amplitudes of such signals by a non-linear factor inverse to the compression of the input signals in the first particular range in the first particular non-linear relationship to restore the amplitudes of the signals separated in the first particular range from the input signals, and means responsive to the frequency-demodulated signals in the second particular range and to the frequency modulated signals and to the expanded signals in a particular non-linear relationship in the first particular range for combining such signals to produce output signals having characteristics corresponding to those of the input signals.

17. In combination for improving the signal-to-noise ratio of a band of input signals where noise occurs primarily in a first particular range of frequencies in the band, means responsive to the input signals for separating the input signals into the first particular range and into a second particular range constituting the band of signals with the signals in the first particular range, means responsive to the signals in the first particular range of frequencies to provide a particular non-linear compression in the amplitudes of the signals in the first particular range in accordance with the frequencies of such signals, means responsive to the compressed signals in the first particular range and to the signals in the second particular range for combining such signals to produce resultant signals, means responsive to the resultant signals for producing modulations in frequency in accordance with the amplitudes of the resultant signals, and means responsive to the signals in the first particular range for amplifying the frequency modulated signals in accordance with the amplitude of the signals in the first particular range.

References Cited in the file of this patent

UNITED STATES PATENTS

| | | |
|---|---|---|
| 2,686,831 | Dome | Aug. 17, 1954 |
| 2,923,887 | Aiken | Feb. 2, 1960 |